US 6,541,761 B1

(12) United States Patent
Holzapfel et al.

(10) Patent No.: US 6,541,761 B1
(45) Date of Patent: Apr. 1, 2003

(54) OPTICAL POSITION MEASURING SYSTEM WITH A GRADUATION THAT CAUSES ESSENTIALLY ONLY FIRST ORDERS OF DIFFRACTION

(75) Inventors: Wolfgang Holzapfel, Obing (DE); Walter Huber, Traunstein (DE)

(73) Assignee: Dr. Johannas Heidenhain GmbH, Traunreut (DE)

( * ) Notice: Subject to any disclaimer, the term of this patent is extended or adjusted under 35 U.S.C. 154(b) by 67 days.

(21) Appl. No.: 09/652,220

(22) Filed: Aug. 30, 2000

(30) Foreign Application Priority Data

Aug. 31, 1999 (DE) .......................... 199 41 318

(51) Int. Cl.$^7$ ................................ G01D 5/34
(52) U.S. Cl. ..................... 250/231.14; 250/231.16; 356/616; 33/707
(58) Field of Search .................. 250/231.16, 237 G, 250/559.29, 559.3, 216, 231.14; 356/616; 33/706, 707

(56) References Cited

U.S. PATENT DOCUMENTS

| | | | |
|---|---|---|---|
| 4,602,436 A | | 7/1986 | Ernst |
| 4,618,214 A | | 10/1986 | Horwitz |
| 4,782,229 A | | 11/1988 | Ernst |
| 5,583,798 A | | 12/1996 | Franz et al. |
| 5,646,730 A | | 7/1997 | Mitchell et al. |
| 5,801,378 A | * | 9/1998 | Hane et al. ............. 250/237 G |
| 5,886,352 A | * | 3/1999 | Wright et al. .......... 250/231.14 |
| 5,994,692 A | | 11/1999 | Holzapfel |

FOREIGN PATENT DOCUMENTS

EP 0 735 346 10/1996

OTHER PUBLICATIONS

Pettigrew, R.M., "Analysis of Grating Imaging and Its Application to Displacement Metrology", SPIE, 1st European Congress on Optics Applied to Metrology, vol. 136, 1977, pp 325–332.
Copy of original claims for Ser. No. 09/485,358 filed Apr. 18, 2000—Holzapfel et al.

* cited by examiner

Primary Examiner—Stephone B. Allen
Assistant Examiner—Eric J Spears
(74) Attorney, Agent, or Firm—Brinks Hofer Gilson & Lione

(57) ABSTRACT

An optical position measuring system that includes a light source, a measuring graduation, a scanning unit movable relative to the measuring graduation in at least one measurement direction. A projection graduation has periodic amplitude and phase structures disposed in alternation in the measurement direction. The arrangement further includes a detection graduation and a plurality of optoelectronic detector elements, wherein light from the light source interacts with the projection graduation so as to project a fringe pattern onto the detection graduation, so that via the plurality of optoelectronic detector elements, displacement-dependent output signals are detectable, and wherein the projection graduation has a structure such that in addition to even orders of diffraction and the zero order of diffraction, at least some of the (2n+1)th orders of diffraction are suppressed, where n=1, 2, 3, . . . , as a result of which essentially only the ±1st orders of diffraction contribute to generating the output signals.

27 Claims, 9 Drawing Sheets

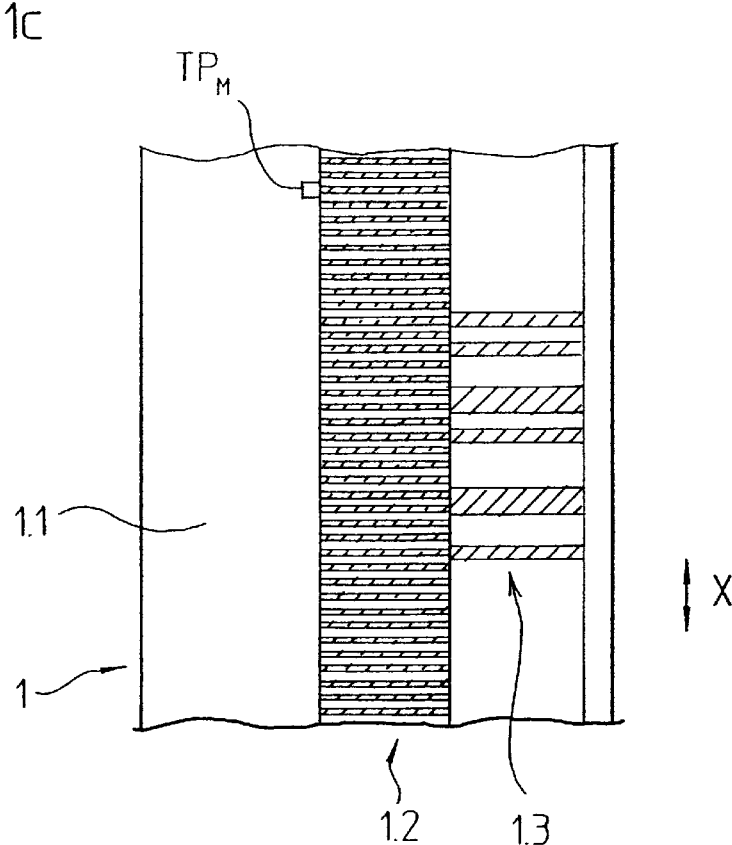
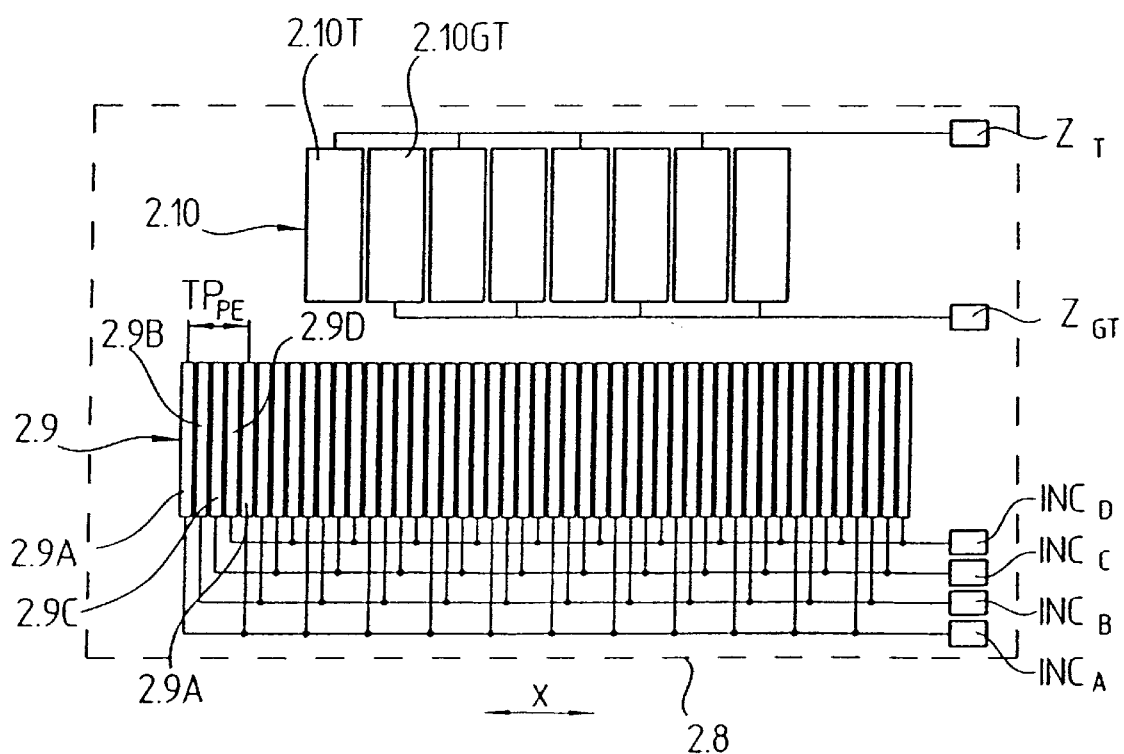

SCANNING SPACING $d_A$

SCANNING SPACING $d_A$

OPTICAL POSITION MEASURING SYSTEM WITH A GRADUATION THAT CAUSES ESSENTIALLY ONLY FIRST ORDERS OF DIFFRACTION

Applicants claim, under 35 U.S.C. §119, the benefit of priority of the filing date of Aug. 31, 1999 of a German patent application, copy attached, Ser. No. 199 41 318.5, filed on the aforementioned date, the entire contents of which is incorporated herein by reference.

BACKGROUND OF THE INVENTION

1. Field of the Invention

The present invention relates to an optical position measuring system that is suitable for precise determination of the relative spacing of two objects movable relative to one another.

2. Discussion of Related Art

Known position measuring systems include a scanned graduation structure as a measuring graduation as well as a scanning unit, movable relative to it in the measurement direction, that has a light source, one or more graduation structures, and a detector arrangement. In the position measuring systems of interest here, the generation of the position-dependent scanning signals is based on the fundamental principles explained below. Thus, in such position measuring systems, with the aid of one or more first graduation structures, a fine fringe pattern is created, which is scanned with the aid of one of more second graduation structures to generate the scanning signals.

In the simplest case, such a position measuring system is a so-called two-grating transducer, in which a first graduation structure is illuminated by a usually collimated light source. The result is a light pattern on the downstream second graduation structure, and the graduation period of the second graduation structure matches the graduation period of the light pattern. In the case of relative motion of the two graduation structures with respect to one another, the result is a periodic modulation of the light beams that pass through the second graduation structure. The light beams that pass through the second graduation structure are detected by optoelectronic detector elements disposed downstream of the second graduation structure. Because of the functional effects of the first and second graduation structures, as they have been explained in the above example, the first graduation structure will hereinafter be called the projection graduation; conversely, the second graduation structure will be called the detection graduation.

For generating a plurality of phase-shifted scanning signals, it is often provided in such position measuring systems that the graduation periods of the detection graduation and of the projection graduation are selected as slightly different from one another. In this case, a fringe pattern whose fringes are oriented parallel to the graduation lines of the detection graduation emerges from the detection graduation. The graduation period of the emerging fringe pattern furthermore has a markedly greater graduation period than the fringe pattern on the detection graduation. For the emerging fringe patterns generated in this way, the term used below will be a so-called Vernier fringe pattern.

Alternatively, it is also possible to rotate the projection graduation and detection graduation slightly relative to one another. Then the graduation lines are not oriented parallel to one another as in the previous cases but instead have a defined small angle from one another. The result then is again an emerging fringe pattern with a markedly greater graduation period, but whose fringes are oriented perpendicular to the fringes of the detection graduation. The term used in this case is so-called moire fringe patterns.

In both cases, that is, in the creation of both Vernier fringe patterns and moiré fringe patterns, the actual scanning of whichever fringe pattern results is done with the aid of a further graduation structure. This graduation structure will be called a Vernier graduation for the sake of simplicity below, but it must be understood that this term does not preclude the case where a moiré fringe pattern is generated. The Vernier graduation must in principle have the same graduation period and graduation orientation as the Vernier or moiré fringe pattern generated. Only the light transmitted through the Vernier graduation then finally strikes one or more detector elements.

With regard to the Vernier graduation, it should be noted that it is also already known to embody the Vernier graduation together with a plurality of detector elements as an integral component, which is used for scanning the resultant Vernier or moiré fringe pattern and for generating the phase-shifted scanning signals.

While the position measuring systems discussed thus far each have included a optical collimator element, systems have also become known that work without such a optical collimator element. In this respect, see for instance the publication by R. Pettigrew, entitled "Analysis of Grating Imaging and its Application to Displacement Metrology" in SPIE, vol. 36, First European Congress on Optics Applied to Metrology (1977), pages 325–332. In such position measuring systems, a further graduation structure, hereinafter called a transmitting graduation, is additionally disposed between the light source and the projection graduation. From each transparent gap or subregion of the transmitting graduation, a beam emerges that with the aid of the projection graduation generates a periodic fringe pattern on the detection graduation. The graduation period of the transmitting graduation is selected here such that the fringe patterns emerging from the various gaps are superimposed on one another to an increased extent on the detection graduation. In this way, even light sources, such as LEDs, that are spatially far apart from one another can be used in these position measuring systems.

In summary, the above-discussed position measuring systems accordingly include at least one projection graduation and one detection graduation. Optionally, a transmitting graduation and/or a Vernier graduation can also be provided, each of which take on the functions discussed above. As a scale or measuring graduation, either the transmitting graduation, the projection graduation or the detection graduation can serve in principle in these position measuring systems.

Both the transmitting graduation and the Vernier graduation are as a rule embodied as amplitude graduation structures; conversely, the projection graduations or detection graduations can also be embodied as phase graduation structures.

An important variable in position measuring systems constructed in this way is in principle their behavior upon a change in the scanning gap. This spacing is as a rule defined by the spacing between the graduations that are movable relative to one another. Any mechanical inadequacies that may occur can then lead to more or less major fluctuations in the scanning gap during measurement operation. However, the least possible influence of such fluctuations in the scanning gap on the position-dependent output signals is to be desired.

In the aforementioned position measuring systems, there is a priori a relatively great dependency of the signal quality, detected by the detector, on the applicable scanning gap. In FIG. 9, to illustrate these problems, the resultant grating pattern contrast in a two-grating transducer is plotted in the detector plane with regard to the scanning gap. A projection graduation is used here that is embodied as a phase graduation structure, with a phase depth $\phi=\pi$ and a line-to-gap ratio of 1:1. It is quite clear from FIG. 9 that there are major interruptions in contrast between the maximum contrast values, and in these interruptions only low-contrast scanning signals can be detected. This in turn means that in the event of a possible undesired fluctuating scanning gap, marked sacrifices in the signal modulation result. Because of this strong dependency of the signal quality on the applicable scanning gap, stringent demands are accordingly made of the mechanical components of the applicable overall system, for instance in terms of guidance precision, etc.

From U.S. Pat. No. 5,646,730, the entire contents of which are incorporated herein by reference, a position measuring system is known in which the aforementioned scanning gap sensitivity is partly minimized. The proposed position measuring system here includes an illuminated transmission measuring graduation, which is embodied as a pure phase structure and which in accordance with the terminology introduced above functions as a projection graduation. Besides the zeroth order of diffraction, the even orders of diffraction are also suppressed by the projection graduation. A detector arrangement for detecting the displacement-dependently modulated interference pattern is placed in a region downstream of the projection graduation, in which essentially only the plus or minus 1st orders of diffraction interfere, the detector arrangement includes a plurality of individual, periodically disposed detector elements. With the terminology introduced above, this means the detection graduation, which in this case is embodied integrally with the detector arrangement or with a plurality of detector elements. In a further embodiment, it is also provided in this patent that the projection graduation be embodied as a complex phase structure, which additionally suppresses high odd orders of diffraction as well, and as a result a somewhat greater insensitivity of the scanning signals to the scanning gap can be achieved.

The spacing insensitivity sought is attained only conditionally, however, in this proposed version. For instance, a pure phase structure, despite the suppression of all the low orders of diffraction, still furnishes pairs of strong higher orders of diffraction, which can interfere with one another and, thus, lead to the undesired spacing dependency. For example, it can be demonstrated that no resultant intensity modulation can be observed immediately downstream of projection gratings embodied in this way.

Furthermore, fine structuring of the corresponding phase graduation is necessary and can accordingly be used only in systems that have coarse graduation periods; in such systems, in turn, however, the spacing dependency is fundamentally not so critical.

It is also considered a disadvantage of this position measuring system that the measuring graduation is embodied as a complex phase structure. The result is relatively major effort and expense for production, especially if a phase structure like that in FIG. 34 of U.S. Pat. No. 5,646,730, for instance, must be manufactured over a relatively long measurement length in the case of a linear measurement system. Furthermore, only a relatively small illuminated region of the projection graduation serves to generate the position-dependent scanning signals, and the result in turn is a high sensitivity of the system to soiling.

OBJECT AND SUMMARY OF THE INVENTION

An object and advantage of the present invention is therefore to disclose an optical position measuring system in which a markedly increased tolerance to fluctuations in the scanning gap exists in the generation of the position-dependent scanning signals. Even if the scanning gap should possibly vary, an adequately constant signal modulation is needed in the event of relative motion of the graduations that are movable relative to one another. In particular, graduation structures should be as simple as possible to manufacture.

The above object and advantage are attained by an optical position measuring system that includes a light source, a measuring graduation, a scanning unit movable relative to the measuring graduation in at least one measurement direction. A projection graduation has periodic amplitude and phase structures disposed in alternation in the measurement direction. The arrangement further includes a detection graduation and a plurality of optoelectronic detector elements, wherein light from the light source interacts with the projection graduation so as to project a fringe pattern onto the detection graduation, so that via the plurality of optoelectronic detector elements, displacement-dependent output signals are detectable, and wherein the projection graduation has a structure such that in addition to even orders of diffraction and the zero order of diffraction, at least some of the (2n+1)th orders of diffraction are suppressed, where n=1, 2, 3, . . . , as a result of which essentially only the ±1st orders of diffraction contribute to generating the output signals.

According to the present invention, it has now been recognized that even graduation structures that are relatively simple to produce can be used in the position measuring systems discussed above to attain the stated objects and advantages, as long as certain graduation structures meet defined requirements. According to the present invention, the applicable projection graduation is embodied with alternating binary phase and amplitude structures, disposed in the measurement direction, that meet certain conditions that will be explained hereafter.

Such graduation structures are already fundamentally known from U.S. Pat. No. 4,618,214, the entire contents of which are incorporated herein by reference. However, this patent provides no suggestion whatever that such graduation structures can be used in the position measuring systems specified. Nor can specific dimensions be learned from this patent for graduation structures embodied in this way, if the graduation structures function as projection graduations in certain scanning arrangements of optical position measuring systems.

Depending on the scanning configuration, the aforementioned projection graduation can be disposed on the most various places in the scanning beam path; that is, a number of possible configurations are available within the scope of the present invention, all of them having the aforementioned advantages with respect to the low sensitivity to the scanning gap. It is understood that linear scanning arrangements can be embodied according to the present invention just as well as rotary variants.

In an advantageous embodiment of the apparatus of the invention, the respective projection graduation is designed such that along with the even orders of diffraction, at least the ±3rd orders of diffraction are suppressed. Already with a provision of this kind, a significant reduction in the scanning gap sensitivity can be achieved, yet without higher orders of diffraction adversely affecting the signal quality.

Further advantages, as well as details of the optical position measuring system in accordance with the invention ensue from the subsequent description of several exemplary embodiments by means of the attached drawings.

BRIEF DESCRIPTION OF THE DRAWINGS

FIGS. 1a–1d are respective views or fragmentary views of a first exemplary embodiment of a position measuring system according to the present invention;

DETAILED DESCRIPTION OF THE PREFERRED EMBODIMENTS

Figure 1A:
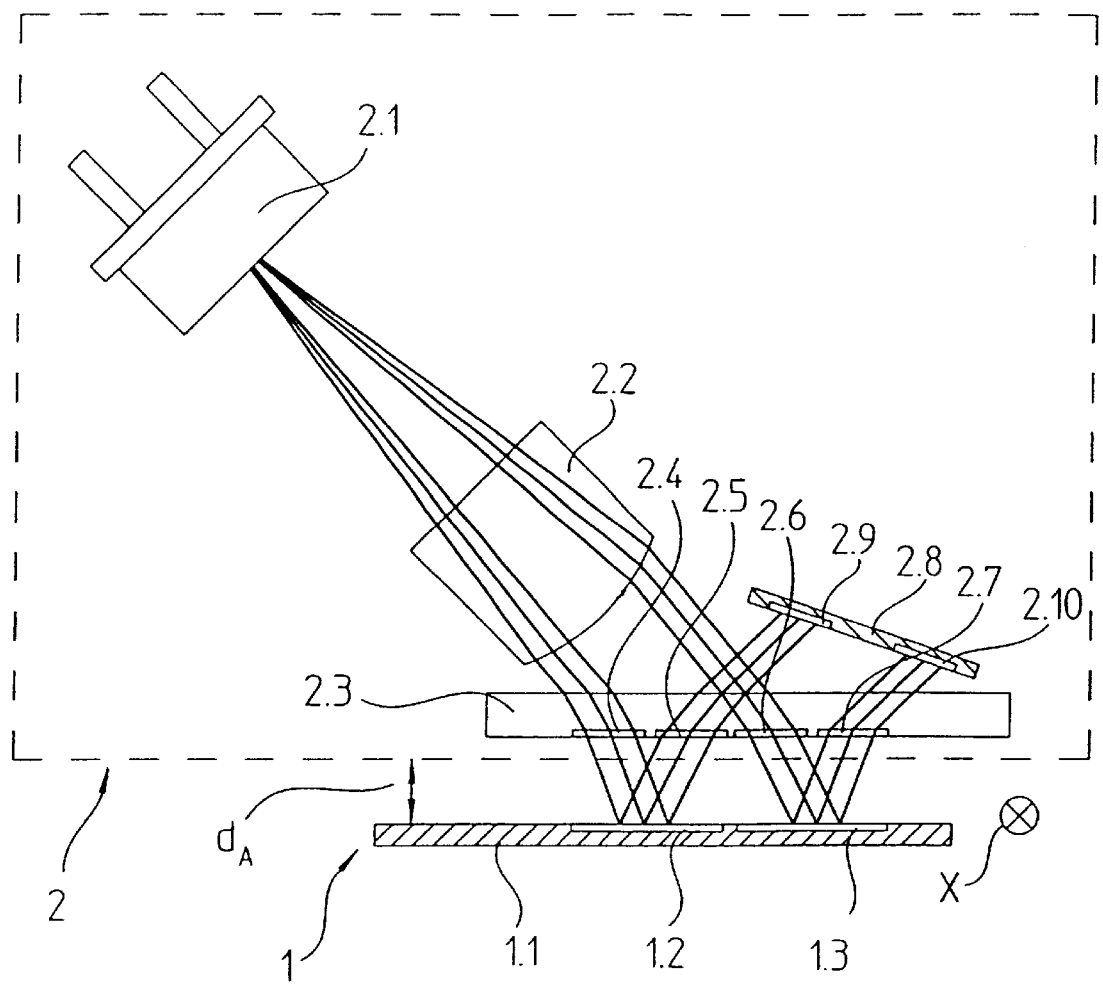
Figure 1B:
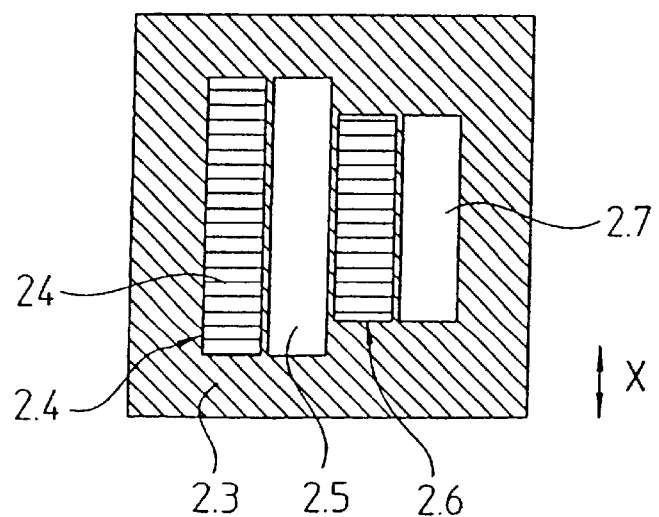

A first embodiment of the position measuring system according to the present invention, embodied as an incident light system, will be described below in conjunction with FIGS. 1a–1d. FIG. 1a schematically shows the scanning beam path, while FIGS. 1b–1d show plan views on the scanner plate, the scale, and the detector arrangement of the position measuring system.

The first embodiment of the position measuring system according to the present invention includes a scale 1 and a scanning unit 2, which are disposed to be movable relative to one another in the indicated measurement direction x; the measurement direction x is oriented perpendicular to the plane of the drawing. The scale 1 and scanning unit 2 are spaced apart from one another by the scanning gap $d_A$. In this variant, the position measuring system shown is used to detect linear relative motions between the scanning unit 2 and the scale 1 along the x axis; for instance, this position measuring system can be used in a numerically controlled machine tool, for detecting the relative position of tool and workpiece with high precision.

On the scale 1, an incremental graduation track embodied in a known manner is disposed as a measuring graduation 1.2 on a substrate body 1.1. Next to the measuring graduation 1.2, for generating the displacement-dependent incremental signals, a reference marking 1.3 is also provided on the substrate body 1.1 of the scale 1 in the exemplary embodiment shown. With the aid of the reference marking 1.3, or by way of generating a corresponding reference pulse signal, an absolute reference is produced in a known manner during measurement operation in the position measurement.

Both the measuring graduation 1.2 and the reference marking 1.3 include an alternating succession, in the measurement direction x, of subregions with different optical reflection properties, such as highly reflective and nonreflective subregions. The graduation period of the incremental measuring graduation 1.2 is designated $TP_M$; $TP_M$ is defined by the sum of the widths of one highly reflective and one nonreflective subregion in the measurement direction x.

In a known manner, the reference marking 1.3 includes an aperiodic distribution of subregions of different reflection properties; naturally, a plurality of such reference markings 1.3 can be provided at defined positions along the applicable measurement route adjacent to the measuring graduation 1.2, examples being spacing-encoded reference marks, and so forth.

The scanning unit 2 of the position measuring system shown includes a light source 2.1, a optical collimator element 2.2, a scanner plate 2.3, and a detection unit 2.8. In the scanner plate 2.3, two window regions 2.4, 2.6 are provided with graduation structures, while two further window regions 2.5, 2.7 are transparent, or in other words are embodied without graduation structures. A first pair of window regions 2.4, 2.5, in conjunction with further components of the position measuring system, serve to generate the displace-dependent incremental signals, while the second pair, having the window regions 2.6, 2.7, serves to generate one or more reference pulse signals. In the detection unit 2.8, a first detector arrangement 2.9 for detecting the incremental signals is provided; next to it is the second detector arrangement 2.10 for detecting the reference pulse signals.

The scanning beam path for generating the incremental signals inside the position measuring system shown will now be explained. At this point, the beam path for generating the reference pulse signals will not be described in further detail.

The beams emitted by the light source 2.1, for instance a high-power infrared LED with a small emission surface area, are aligned parallel by the optical collimator element 2.2 and pass through the graduation structure in the window region 2.4 in the scanner plate 2.3. The graduation structure in the window 2.4 of the scanner plate 2.3, in the present case, is the projection graduation of the position measuring system in question, which is embodied as a transmission graduation. Further detail of the embodiment of the projection graduation according to the invention will be provided in the course of the ensuing description. Next, the beams passing through the projection graduation in the window region 2.4 strike the measuring graduation 1.2 on the scale 1, which in this example is embodied as a reflection measuring graduation. The measuring graduation 1.2 in this embodiment of the position measuring system of the invention serves as a detection graduation in the manner described above. The projection graduation and the detection graduation also has slightly different graduation periods, so that once reflection has occurred at the detection graduation or the measuring graduation, a periodic Vernier fringe pattern results, as has been explained above. From the measuring graduation 1.2 or detection graduation, the beams are reflected in the direction of the transparent window region 2.5 of the scanner plate 2.3. After passing through the transparent window region 2.5, the beams reach the detector arrangement 2.9 in the detection unit 2.8. The detector arrangement 2.9 serves to detect the Vernier fringe pattern and to generate the displacement-dependent incremental signals. The Vernier graduation required for generating the incremental signals and the detector elements are embodied as an integrated component, in the form of a so-called structured detector arrangement 2.9, as shown in FIG. 1d. In this embodiment of the position measuring system of the invention, accordingly, no Vernier graduation separate from the detector elements is provided. The detector arrangement 2.9 conversely includes many individual narrow, rectangular detector elements 2.9A, 2.9B, 2.9C, 2.9D, which are disposed adjacent one another in the measurement direction x. Each n=4 detector elements 2.9A, 2.9B, 2.9C, 2.9D, in this embodiment, are disposed within one period $TP_{PE}$ of the structured detector arrangement. In this embodiment, this period $TP_{PE}$ accordingly corresponds to a graduation period of the Vernier graduation. Detector elements 2.9A, 2.9B, 2.9C, 2.9D, which each furnish in-phase incremental scanning signals $INC_A$, $INC_B$, $INC_C$, $INC_D$ when the Vernier fringe pattern is scanned, are conductively connected to one another as shown; that is, in the exemplary embodiment shown, all the detector elements having reference numeral 2.9A are connected to one another; the same is true for the detector elements with reference 2.9B, etc. A. The four scanning signals $INC_A$, $INC_B$, $INC_C$, $INC_D$ generated in this way then have a phase offset of 90° each from each other. From the scanning signals $INC_A$, $INC_B$, $INC_C$, $INC_D$, two incremental signals with a 90° phase offset and free of a direct current component are then generated in a known manner, with the aid of differential amplifiers, and further processed, for instance by an evaluation device, not shown.

The detector arrangement 2.10 shown in FIG. 1d for generating the reference pulse signal also comprises many individual detector elements 2.10T, 2.10GT, which are disposed in succession in the measurement direction x. Every other detector element 2.10T, 2.10GT is connected to one another, so that the two output signals $Z_T$ and $Z_{GT}$ result, which are connected to one another in a subtractive manner to finally furnish the reference pulse signal in a known manner. For further details on generating the reference pulse signal, German Patent Application 199 36 181.9 and corresponding U.S. patent application Ser. No. 09/443,238, filed on Nov. 18, 1999, of the present Applicant are referred to in this respect. The entire contents of U.S. patent application Ser. No. 09/443,238 are incorporated herein by reference.

A first, preferred embodiment of a suitable projection graduation 24 will be described below in conjunction with FIGS. 2a and 2b, in terms of how it is used in the first exemplary embodiment of the position measuring system in FIGS. 1a–1d in the window region 2.4 of the scanner plate 2.3. The use of a projection graduation 24 of this kind assures that the position measuring system of the invention has markedly greater tolerance to fluctuations in the scanning gap $d_A$ between the scale 1 and the scanning unit 2.

Figure 2A:
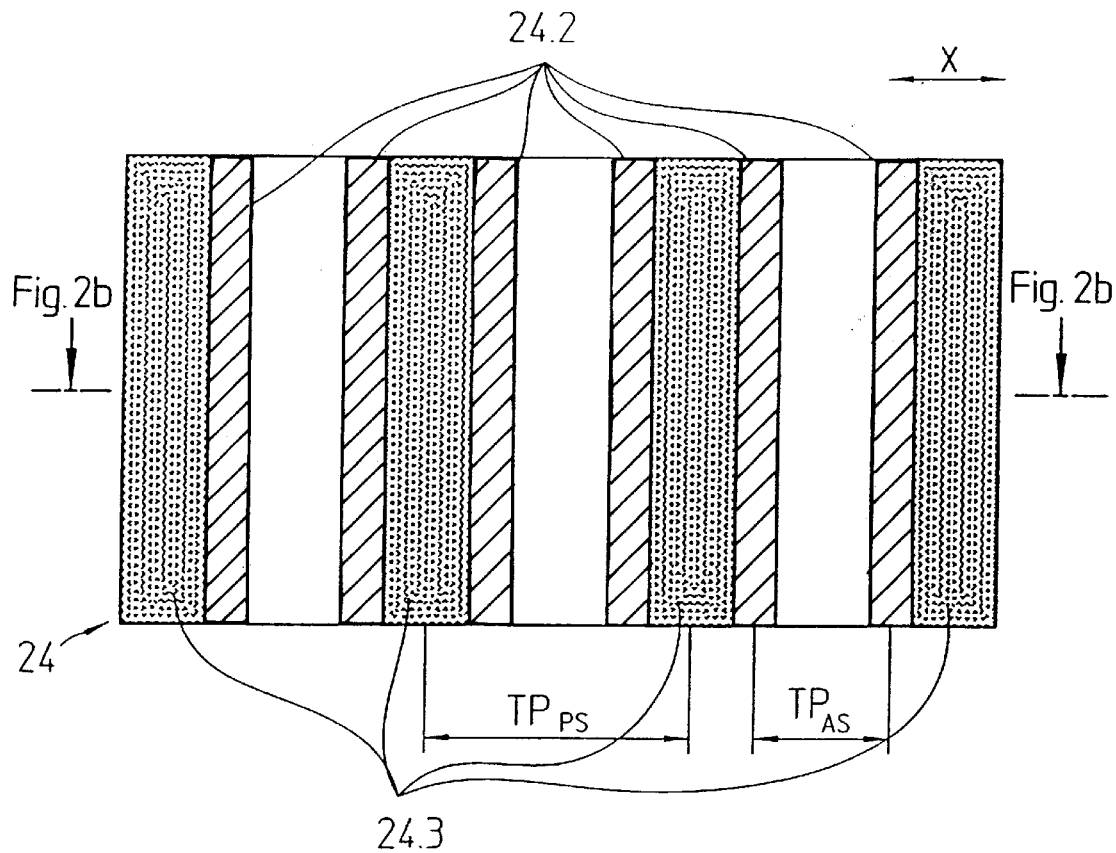
FIGS. 2a and 2b are each a fragmentary view of a first embodiment of a suitable projection graduation for the position measuring system of FIGS. 1a–d according to the present invention.
Figure 2B:
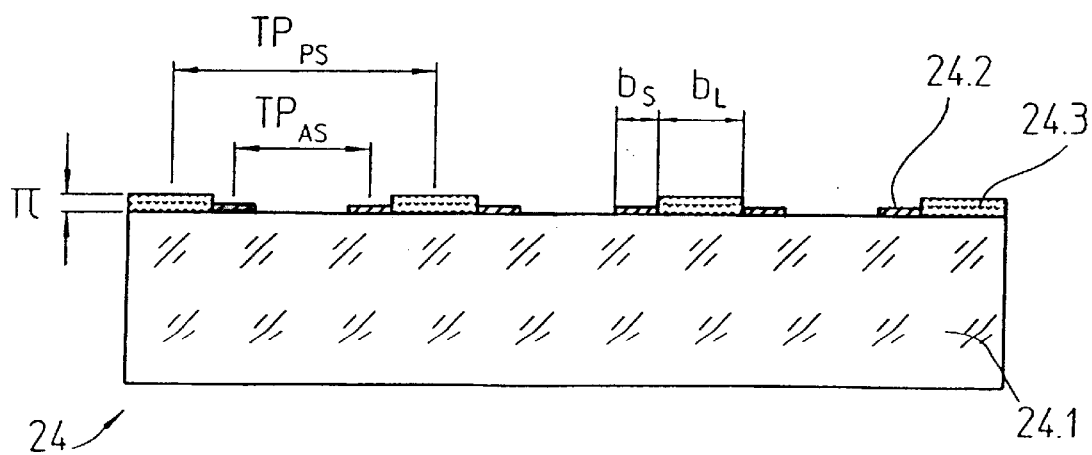

FIG. 2a shows a plan view on a portion of the projection graduation 24, which in this variant is embodied as a transmission graduation, while in FIG. 2b a sectional view through the projection graduation 24 is shown, through the section line shown in FIG. 2a.

The projection graduation 24 in this exemplary embodiment comprises a graduation structure which is disposed on the top side of transparent carrier substrate 24.1, for instance of glass. The actual graduation structure in turn includes periodic amplitude and phase structures disposed in alternation in the measurement direction x. The amplitude structure is formed by periodically disposed opaque lines 24.2, for instance of chromium. The periodic phase structure, conversely, also has periodically disposed lines 24.3, which have a phase-shifting effect on the light passing through; as the material for the phase-shifting lines 24.3, $TiO_2$, $SiO_2$, or transparent sol-gel layers are suitable. The resultant phase depth $\phi$ of the lines 24.3 is selected such that $\phi=\pi$.

For the production of projection graduations 24 embodied in this way, it proves to be advantageous to select the lines 24.3 of the phase structure as slightly wider than what is shown in FIG. 2b, so that the line edges are located approximately in the middle of or under the opaque lines 24.2 of the amplitude structure.

Another decisive factor for the advantageous effect of the projection graduation 24 in the position measuring system of the invention is the choice of graduation periods or periodicities of the phase and amplitude structures of the projection graduation 24. The graduation period of the amplitude structures, or the periodicity of the opaque lines 24.2, will be referred to below as $TP_{AS}$; $TP_{PS}$, conversely, indicates the graduation period of the phase-displacing lines 24.3 of the periodic phase structure. According to the invention, the graduation periods $TP_{AS}$, $TP_{PS}$ should be selected according to the following equations (1) and (2):

$$TP_{AS}=\tfrac{1}{2}*TP_{PS} \qquad \text{(equation 1)}$$

$$TP_{AS}=1/\eta*TP_{DA} \qquad \text{(equation 2)}$$

The parameter $\eta$ in equation (2) represents a divergence-dictated enlargement factor, which is selected to be other than $\eta=1$ only in the case of divergent illumination without collimation optics. In the exemplary embodiment of FIGS. 1a–1d, where a system with collimation optics has been described, conversely, $\eta=1$ should be chosen. In principle, $\eta$ is in the range $[1:+\infty]$. In general, the enlargement factor $\eta$ is obtained in accordance with the following equation (2'):

$$\eta=1+D_2/D_1 \qquad \text{(equation 2')}$$

Here the variables $D_2$ and $D_1$ represent gaps between certain graduations in the scanning beam path, as will be described in further detail below in conjunction with FIG. 3.

Figure 3:
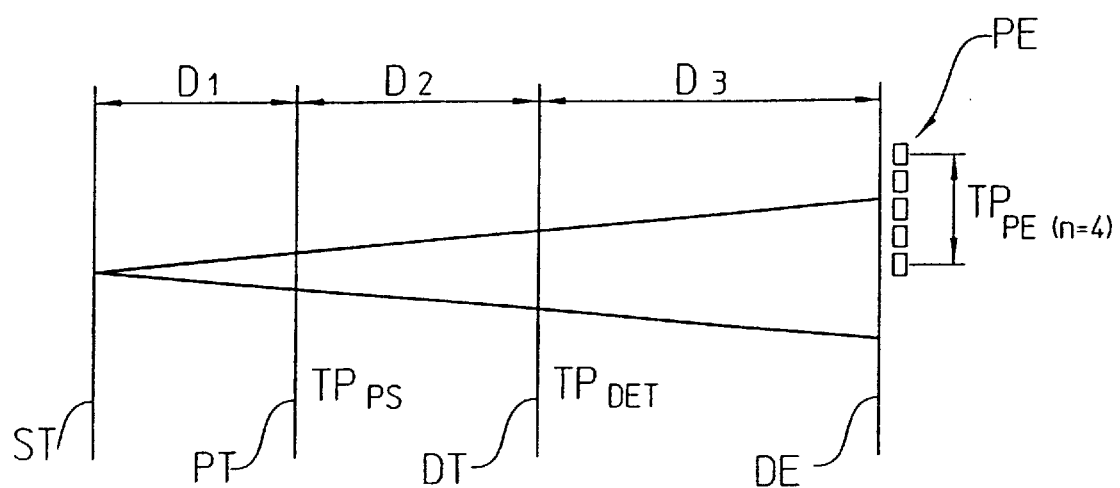
FIG. 3 shows an exemplary embodiment of the position measuring system of FIGS. 1a–d according to the present invention in a developed view to explain certain geometrical variables.

As shown schematically and not to scale in FIG. 3, the variable $TP_{DA}$ also used in equation (2) can be seen to represent the period of the resultant fringe pattern immediately upstream of the applicable detection graduation. In the general case, $TP_{DA}$ is obtained by the following equations (3) and (3'):

$$TP_{DA}=(TP_{DET}*\Lambda)/(\Lambda\pm TP_{DET}) \qquad \text{(equation 3)},$$

and $$\Lambda=((D_1+D_2)/(D_1+D_2+D_3))*(TP_{PE}/(n*m.\pm 1)) \qquad \text{(equation 3')}$$

To explain the various variables in equations (2'), (3), (3'), see FIG. 3, which shows the developed structure of a position measuring system with the relevant geometric parameters. In the above-discussed general case, this comprises an (optional) transmitting graduation ST, a projection graduation PT, a detection graduation DT, and an (optional) Vernier graduation and detector elements downstream of it. In the variant shown in FIG. 3, the Vernier graduation and the detector elements are embodied as an integral component, in the form of the already-mentioned structured detector arrangement PE in the detection plane DE.

The various parameters in the two equations (3), (3') are defined as follows:

$TP_{DET}$:=graduation period of the detection graduation employed $D_1$:=spacing between transmitting graduation and projection graduation, if a divergent system with a transmitting graduation is involved $D_2$:=spacing between projection graduation and detection graduation $D_3$:=spacing between detection graduation and detection plane $TP_{PE}$:=periodicity of the detector arrangement in the detection plane, or graduation period of the Vernier graduation in the detection plane n=1, 2, . . . : number of phase-shifted signal components that are to be furnished by the detector arrangement

M=0, 1, 2, 3, . . .

The above equations describe both the case of collimated illumination and the case where a position measuring system of the invention is embodied with divergent illumination. In the case of collimated illumination, as described above, no transmitting graduation is needed; that is, $D_1 \to \infty$. In the case of divergent illumination without a Vernier graduation, conversely, in the equations (3) and (3') given, $D_3=0$, and $TP_{DET} \to \infty$ should be chosen. The function of the detection graduation in this case is taken over directly by the structured detector arrangement.

It is also assured by the projection graduation 24 shown in FIGS. 2a and 2b that besides the zero order of diffraction and the even orders of diffraction, the ±3rd orders of diffraction are suppressed as well. This is assured by the choice of the suitable widths of the transparent and opaque regions of the amplitude structure and by the optical effect of the phase-shifting subregions. In the amplitude structure, within one graduation period $TP_{AS}$, the width $b_s$ of an opaque line 24.2 is selected in accordance with $b_s=\frac{1}{3} TP_{AS}$; that is, the width $b_L$ of a transparent gap region of the amplitude structure is then accordingly $b_L=\frac{2}{3} TP_{AS}$. In every other transparent gap region of the amplitude structure, a phase-shifting subregion 24.3 is provided, with the phase depth $\phi=\pi$.

The aforementioned values for the various widths are obtained by calculations made in accordance with scalar diffraction theory.

Figure 8:
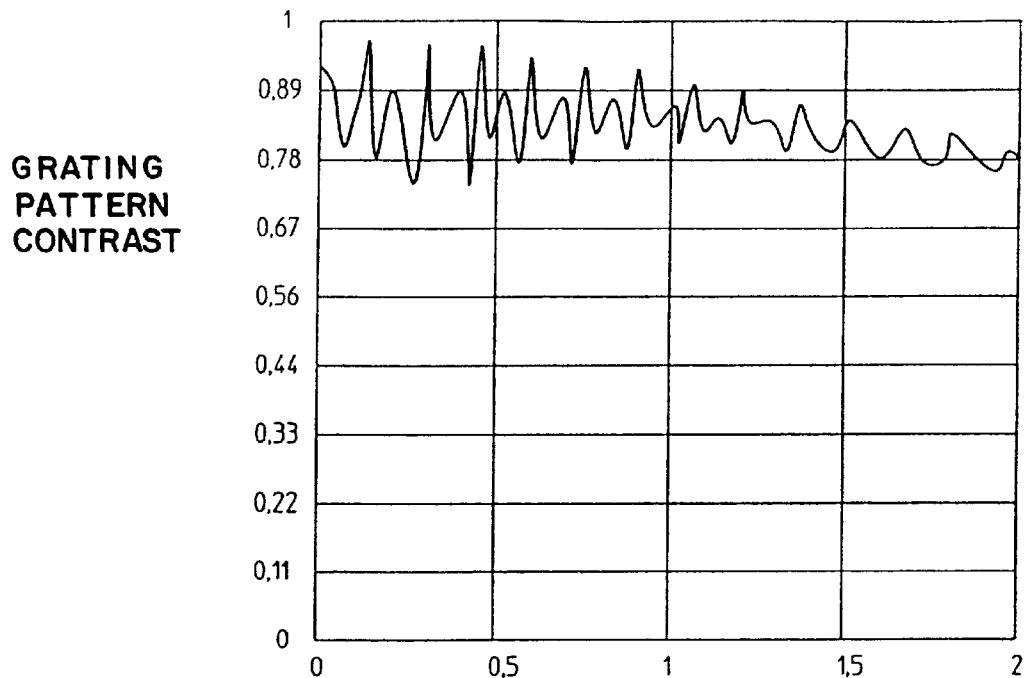
FIG. 8 is an illustration of the dependency of the grating pattern contrast on the scanning gap in position measuring systems designed according to the present invention.
Figure 9:
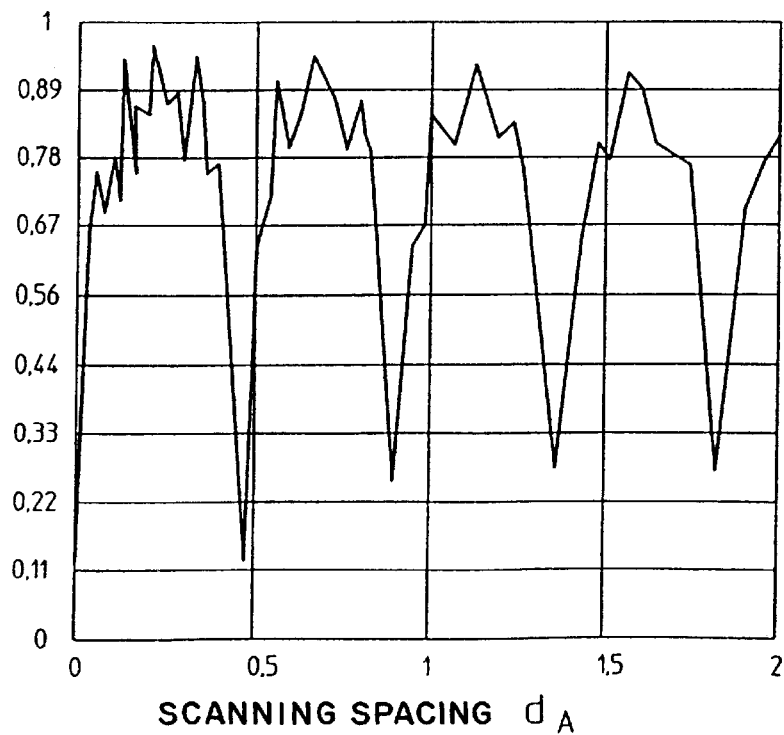
FIG. 9 is an illustration of the dependency of the grating pattern contrast on the scanning gap in systems according to the prior art.

As already indicated above, because of the embodiment of the projection graduation 24, in particular, according to the invention a markedly greater tolerance now exists to possible fluctuations in the scanning gap $d_A$. In this connection, FIG. 8 may be referred to for illustration; it shows the resultant grating image contrast as a function of the scanning gap $d_A$ in a position measuring system embodied according to the invention. It is clearly apparent here how in comparison to FIG. 9, a largely constant grating image contrast and thus a constant quality of the scanning signals now results over a relatively wide range of the scanning gap $d_A$.

Numerical examples will now be given for a specific exemplary embodiment of the present invention, based on the first exemplary embodiment of the position measuring system and on the projection graduation explained:

$D_1 \to \infty$; $D_2=0.8$ mm; $D_3=3$ mm $TP_{DET}=20\mu m$; $TP_{PS}=39.024\mu m$; $TP_{AS}=19.512\mu m$ $\Lambda=800\mu m$; $TP_{DA}=19.512\mu m$; $TP_{PE}=800\mu m$ n=4; m=0

Other possible embodiments for suitable projection graduations will now be explained in conjunction with FIGS. 4a, 4b, 5a and 5b. These variants are based in principle on the first exemplary embodiment explained, in FIGS. 2a and 2b.

In the two variants that follow, only the embodiment of the subregions 24.2 of the projection graduation differ from the first example, in which they were embodied as completely opaque.

Figure 4A:
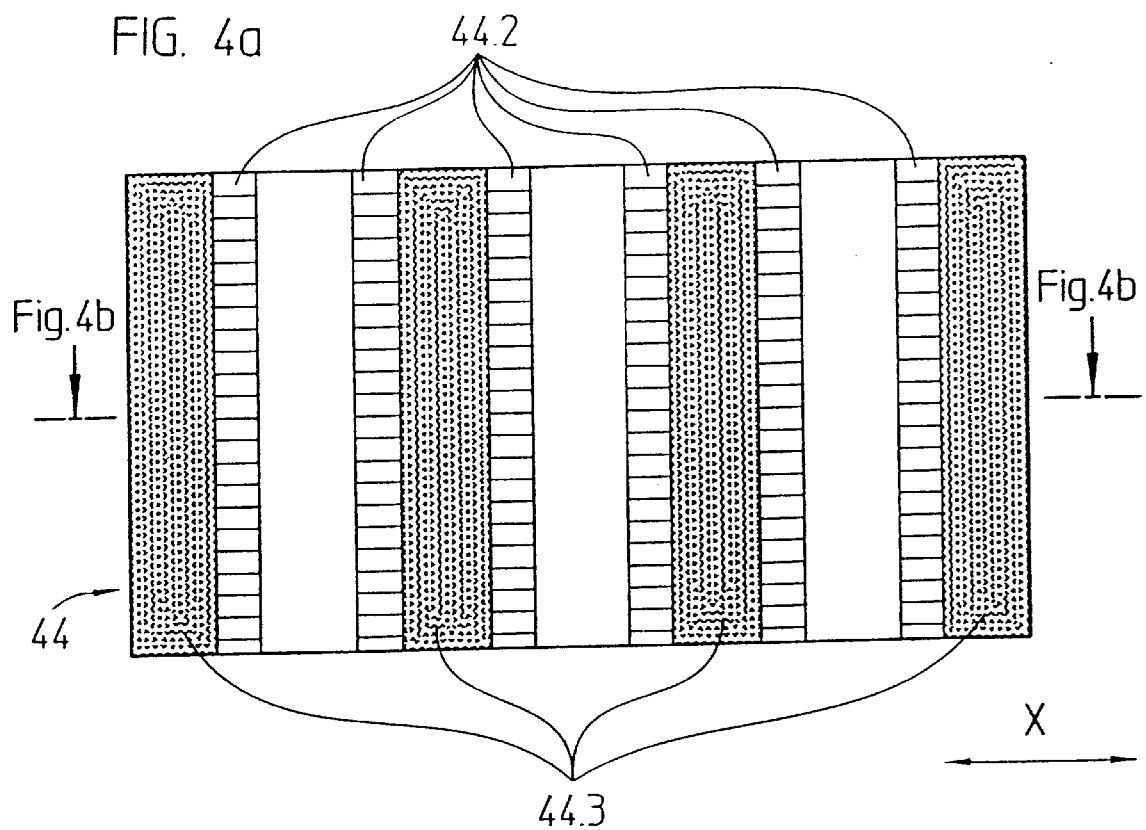
FIGS. 4a and 4b are each a fragmentary view of a second embodiment of a suitable projection graduation for the position measuring system of FIGS. 1a–d according to the present invention.
Figure 4B:
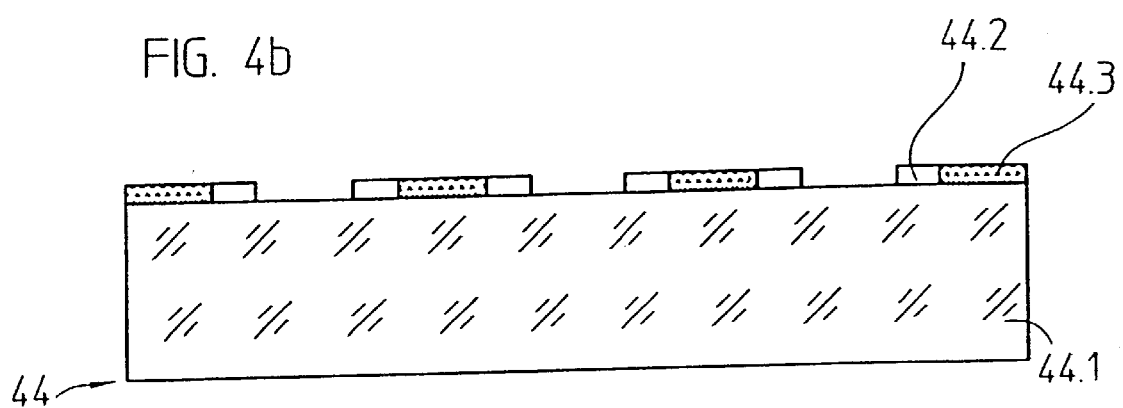

In the second exemplary embodiment of FIGS. 4a, 4b, the subregions 44.2, which are disposed on the carrier substrate 44.1, are to be provided with a diffracting transversal graduation substructure, which has a marked deflecting action perpendicular to the measurement direction x. This graduation substructure in the final analysis, like the opaque subregions of the first example, has the effect that no light passes from these subregions to reach the direction of the detector elements. To that end, in the direction transverse to the measurement direction x, a corresponding diffraction structure should be provided in these subregions 44.2. Otherwise, the dimensioning rules given above apply to these variants of the projection graduation 44 as well. The periodically disposed subregions 44.3 of the phase structure are embodied as above.

Figure 5A:
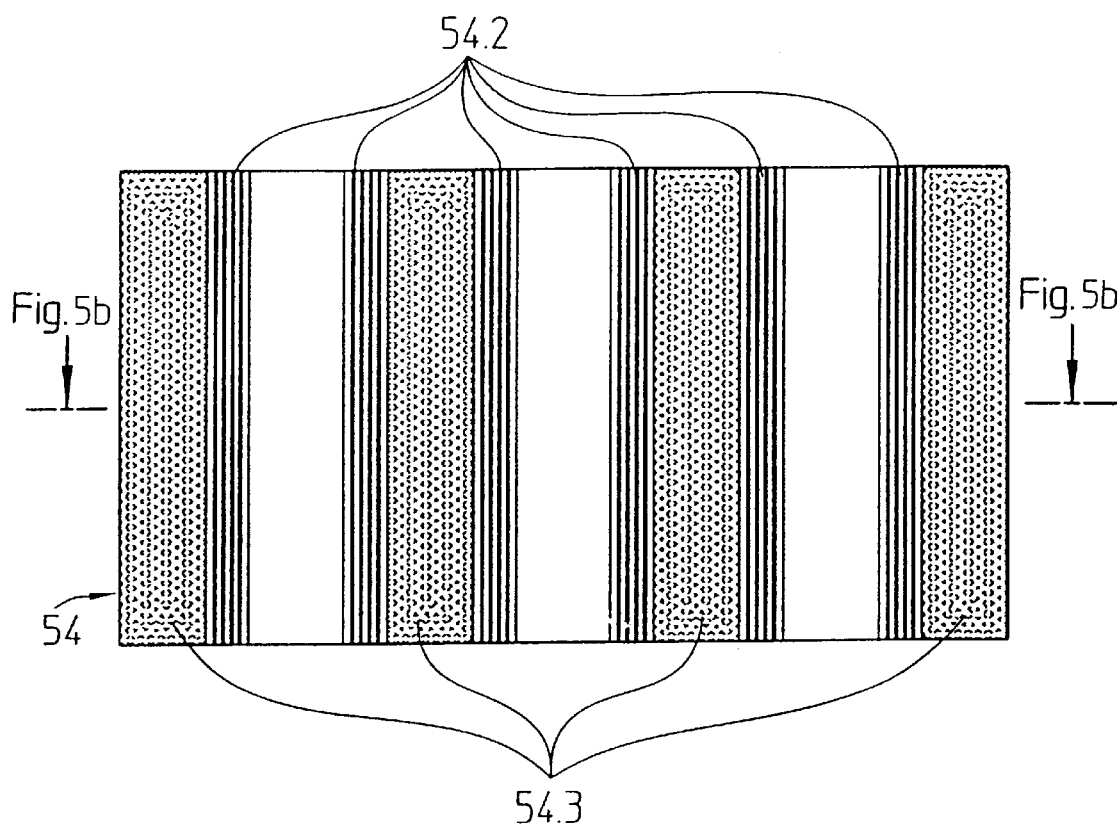
FIGS. 5a and 5b are each a fragmentary view of a third embodiment of a suitable projection graduation for the position measuring system of FIGS. 1a–d according to the present invention.
Figure 5B:
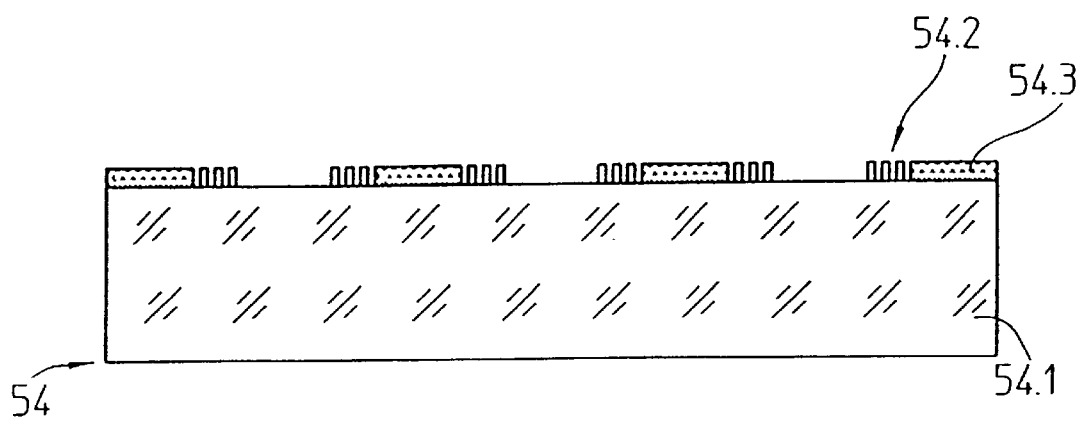

The third exemplary embodiment of a suitable projection graduation 54, which is shown in different views in FIGS. 5a and 5b, is similar to the second example. Unlike the previous variant, in the regions 54.2 a graduation substructure is now provided that is disposed parallel to the basic graduation structure of the projection graduation. This graduation substructure likewise causes a sharp deflection of light out of these subregions 54.2, so that finally, once again, light from these subregions 54.2 is prevented from reaching the detector elements. The embodiments of the subregions 54.3 of the phase structure on the carrier substrate 54.1 is as in the above exemplary embodiment.

In the last two exemplary embodiments explained for suitable projection graduations, the opaque subregions of the amplitude structure of the first exemplary embodiment of FIGS. 2a, 2b were accordingly provided with suitable graduation substructures. Because of the sharp deflecting actions, these like the opaque subregions of the first example have the effect that no light from these subregions reaches the direction of the detector elements. Thus, these subregions are to be considered as functionally equivalent to the amplitude structures of the first exemplary embodiment.

In conclusion, two further variant embodiments of the optical position measuring system of the invention will be explained in conjunction with FIGS. 6a, 6b and 7, which show modified scanning configurations in comparison with the first embodiment of FIGS. 1a–1d.

Figure 6A:
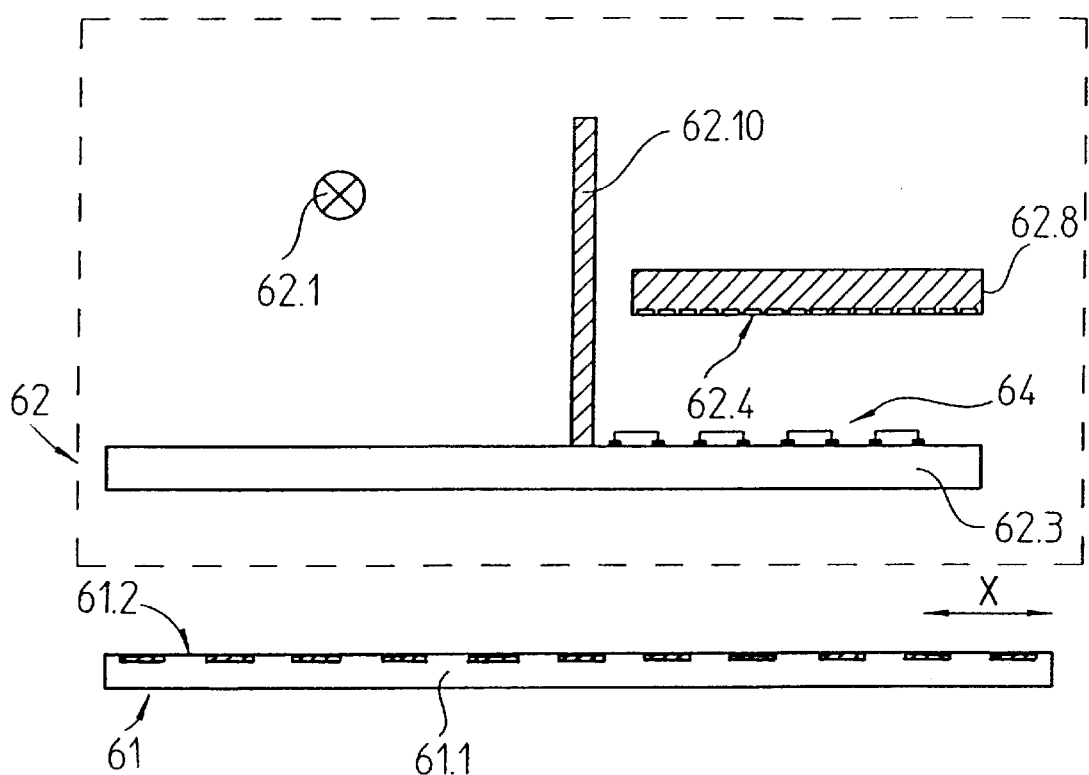
FIGS. 6a and 6b are each views and fragmentary views of a second exemplary embodiment of a position measuring system according to the present invention.
Figure 6B:
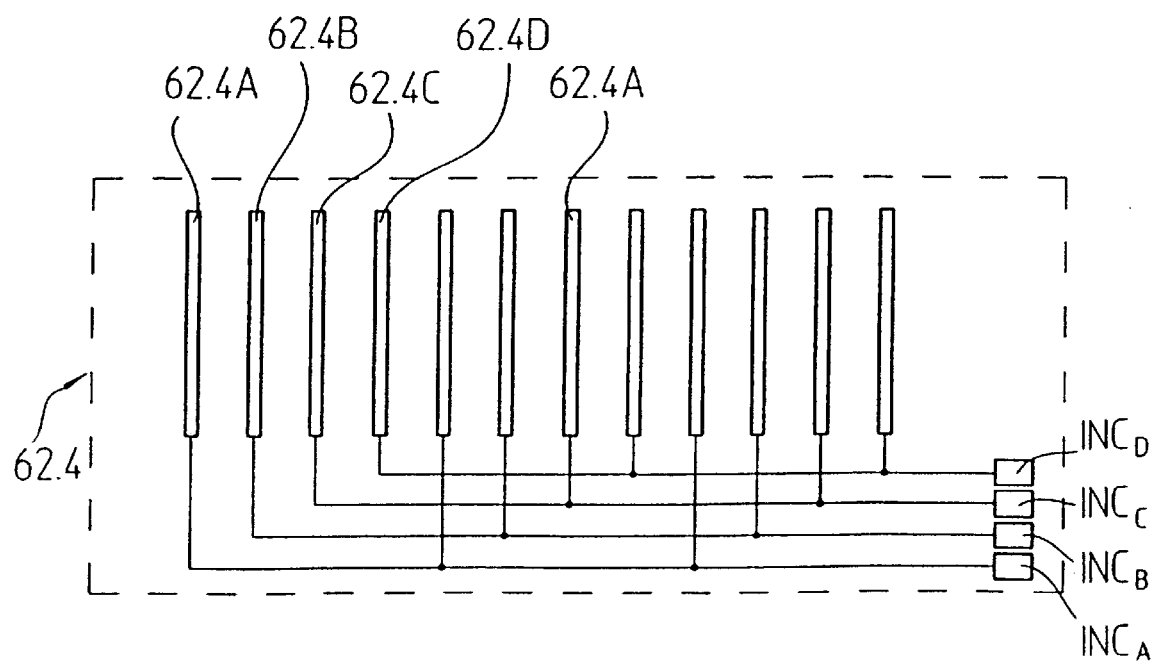
Figure 7:
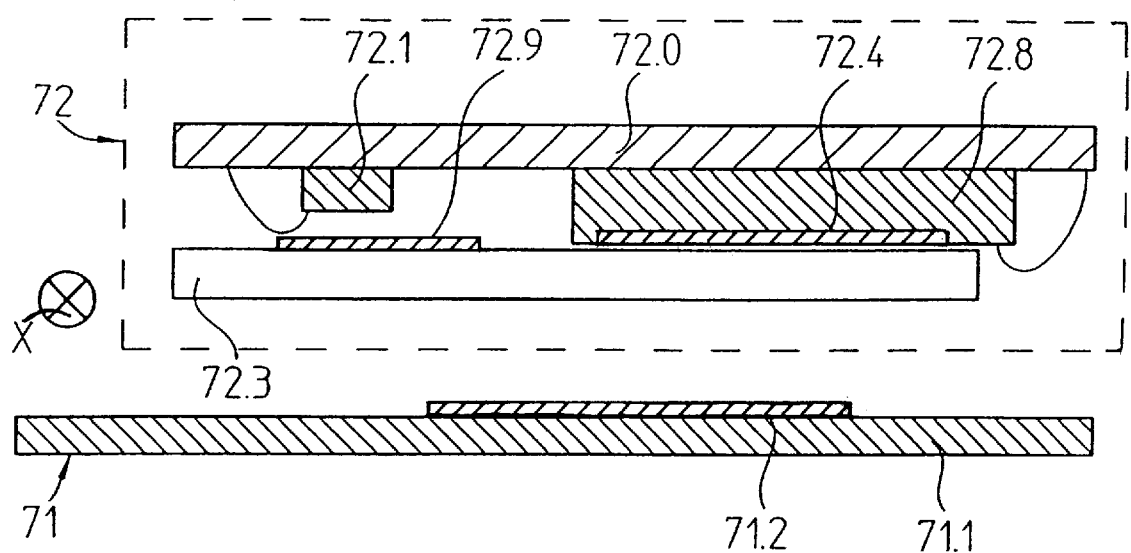
FIG. 7 is a view of a third exemplary embodiment of a position measuring system according to the present invention.

In FIG. 6a, the basic structure of a second exemplary embodiment of a position measuring system of the invention is shown, which again includes a scale 61 and a scanning unit 62 movable in the measurement direction x relative to it. Once again, a suitable periodic measuring graduation 61.2 is disposed in a known manner on a carrier body 61.1 of the scale 61. In the scanning unit 62, a light source 62.1, a scanner plate 62.3 with a projection graduation 64 disposed on it, a detection unit 62.8 with a structured detector arrangement 62.4, and a screen element 62.10 are provided.

The beams emitted by the light source 62.1 first—without prior collimation—pass through the scanner plate 62.3, which in this region is not optically effective, to reach the reflective measuring graduation 61.2 of the scale 61. The measuring graduation 61.2 now acts in the manner described at the outset as a transmitting graduation in the system with divergent illumination; that is, the transmitting graduation is embodied as a reflection graduation. Because of the divergent illumination provided, a shutter 62.10 is disposed in the scanning unit 62 between the light source 62.1 and the detection unit 62.8; the shutter prevents emitted radiation from the light source 62.1 from reaching the detector arrangement 62.4 directly. From the measuring graduation 61.2, a back-reflection of the beams striking it occurs in the direction of the projection graduation 64, which is disposed on the scanner plate 62.3. The projection graduation 64 is in turn embodied approximately like the exemplary embodiment explained in terms of FIGS. 2a, 2b, thus assuring the requisite independence of the resultant grating image contrast from the scanning gap. The periodic fringe pattern generated in this way finally reaches the detector arrangement 62.4 in the detector arrangement 62.8. As also already explained at the outset, the detection graduation in conjunction with the detector elements is now embodied such that these are formed by a so-called structured detector arrangement 62.4, of the kind shown in FIG. 6b. The detector elements and the detection graduation are accordingly embodied as an integral component. The structured detector arrangement 62.4 therefore includes a number of individual detector elements 62.4A, 62.4B, 62.4C, 62.4D, which are disposed adjacent to one another and periodically in the measurement direction x. Detector elements which in scanning the fringe pattern generated produce in-phase output signals are again interconnected, so that finally, four output signals $INC_A$, $INC_B$, $INC_C$, and $INC_D$ phase-offset by 90° result, which can be further processed subsequently in a known way.

In contrast to the first exemplary embodiment, a substantially finer fringe pattern now occurs in the detection plane. The reason for this is that now a separate detection graduation, which as explained above generates a substantially coarser Vernier fringe pattern from an originally fine fringe pattern, is not provided. The detection of this kind of fine fringe pattern as a rule requires certain provisions to be made in the structured detector arrangement 62.4, since because of crosstalk between adjacent detector elements 62.4A, 62.4B, 62.4C, 62.4D, the individual detector elements cannot be disposed arbitrarily close together. For this reason, the spacings between adjacent detector elements 62.4A, 62.4B, 62.4C, 62.4D in the measurement direction x are selected to be greater than one-half of one fringe period. This means that the parameter m should be selected to be m>0. Furthermore, the widths of the detector elements 62.4A, 62.4B, 62.4C, 62.4D should be selected to be less than the applicable fringe period. An opaque metal layer which is vapor-deposited onto the structured detector arrangement 62.4 and has openings in the region of the individual detector elements 62.4A, 62.4B, 62.4C, 62.4D, prevents an undesired incidence of light between the detector elements 62.4A, 62.4B, 62.4C, 62.4D.

A third exemplary embodiment will be explained in closing, in conjunction with FIG. 7; this variant again differs from the variants described above in terms of the scanning beam path.

In this example, the scale 71 and scanning unit 72 are displaceable relative to one another in the indicated measurement direction x, which in turn is oriented perpendicular to the plane of the drawing. The scale 71 comprises a carrier body 71.1, on which a measuring graduation 71.2 that is periodic in the measurement direction x is disposed. In the scanning unit 72, a light source 72.1 and a detection unit 72.8 with a detector arrangement 72.4 are disposed on a printed circuit board 72.0. Furthermore, the scanning unit 72 includes a scanner plate 72.3 with a transmitting graduation 72.9 disposed on it; the scanner plate 72.3 precedes the printed circuit board 72.0 in the scanning unit 72.

The beams emitted by the light source 72.1 first—again without prior collimation—pass through the transmitting graduation 72.9, embodied as a transmission graduation, on the scanner plate 72.3 before the beams strike the measuring graduation 71.2, which in this example now acts as a projection graduation. In this embodiment, the projection graduation is accordingly embodied as a reflection graduation, and once again, the projection graduation or measuring graduation 71.2 is embodied fundamentally as described in the example of FIGS. 2a, 2b, so that the required independence from the scanning gap results.

Instead of the opaque lines in the case of the transmission graduation, the amplitude structure now comprises lines with low reflection and/or with strongly light-scattering or light-deflecting properties. The phase-displacing action of the phase structure is generated in a known manner by reflection surfaces of different heights. Alternatively, phase-shifting transparent lines can also be applied to a reflective layer.

The beams reflected by the measuring graduation 71.2 or projection graduation then pass through a transparent region of the scanner plate 72.3, before they strike the detector arrangement 72.4, which is again embodied as a structured detector arrangement. This means that the requisite detection graduation and the detector elements are embodied in an integral component as a structured detector arrangement 72.4, approximately as in the exemplary embodiment of FIG. 1d.

In contrast to the second variant embodiment described above, the spacings $D_1$ and $D_2$ now remain the same even if the scanning gap should change, and thus according to equation (2'), the enlargement factor η is constant. Since furthermore the spacing $D_3$ is approximately zero, or $D_3 \approx 0$, the individual graduation periods can be selected fixedly and independently of the scanning gap. Once again, the advantageous result is especially high assembly tolerances.

Along with the variants described above of the optical position measuring system of the invention, alternative embodiments naturally also exist within the scope of the present invention.

For instance, instead of the combination of an elongated, divergently projecting light source and transmitting graduation, a point-type, divergently projecting light source can also be used, such as a semiconductor laser, without a transmitting graduation. In that case, the variable $D_1$ designates the spacing between the point-type light source and the projection graduation. Further suitable modifications of the present invention are naturally possible.

We claim:

1. An optical position measuring system, comprising:
a detection graduation that functions as a measuring graduation;
a scanning unit spaced from said detection graduation and movable relative to said detection graduation in at least one measurement direction, said scanning unit comprising:
a light source that emits light;
a projection graduation that receives said light emitted by said light source, said projection graduation comprising periodic amplitude and phase structures disposed in alternation in the measurement direction so as to generate a first set of beams of light that impinge upon said detection graduation;
a plurality of optoelectronic detector elements that receive a second set of beams that are generated by said detection graduation in response to said detection graduation receiving said first set of beams; and
wherein said light emitted from said light source interacts with said projection graduation so as to project a fringe pattern onto said detection graduation, so that via said plurality of optoelectronic detector elements, displacement-dependent output signals are detectable, and wherein said projection graduation has a structure such that in addition to even orders of diffraction and the zero order of diffraction, at least some of the (2n+1)th orders of diffraction are suppressed, where n=1, 2, 3, . . . , as a result of which essentially only the ±1st orders of diffraction contribute to generating said output signals.

2. The optical position measuring system of claim 1, further comprising:
a transmitting graduation that receives said light from said light source and transmits light to said projection graduation.

3. The optical position measuring system of claim 1, further comprising:
a fringe pattern graduation that receives light from said detection graduation and directs said second set of beams to said plurality of optoelectronic detector elements.

4. The optical position measuring system of claim 3, wherein said fringe pattern graduation and said plurality of optoelectronic detector elements are embodied as an integral component in the form of a detector arrangement.

5. The optical position measuring system of claim 1, wherein said projection graduation has a structure such that with it, besides the even orders of diffraction and the zero order of diffraction, the ±3rd orders of diffraction are suppressed.

6. The optical position measuring system of claim 1, wherein said projection graduation being embodied as a transmission graduation.

7. The optical position measuring system of claim 1, wherein beams emitted by said light source reach said projection graduation, embodied as a transmission graduation, via a optical collimator element, and said beams then strike said detection graduation, embodied as a reflection graduation, and after back-reflection from said detection graduation, said beams reach said plurality of optoelectronic detector elements.

8. The optical position measuring system of claim 7, wherein said projection graduation is disposed in said scanning unit on a scanner plate, which is adjacent to said projection graduation which further has a transparent window region, through which beams reflected by said detection graduation pass in the direction of said plurality of optoelectronic detector elements.

9. An optical position measuring system, comprising:
a detection graduation that functions as a measuring graduation;
a scanning unit spaced from said detection graduation and movable relative to said detection graduation in at least one measurement direction, said scanning unit comprising:
a light source that emits light;
a transmitting graduation that receives said light from said light source and transmits light;
a projection graduation that receives said light transmitted by said transmitting graduation, said projection graduation comprising periodic amplitude and phase structures disposed in alternation in the measurement direction so as to generate a first set of beams of light that impinge upon said detection graduation;
a plurality of optoelectronic detector elements that receive a second set of beams that are generated by said detection graduation in response to said detection graduation receiving said first set of beams; and wherein said light emitted from said light source interacts with said projection graduation so as to project a fringe pattern onto said detection graduation, so that via said plurality of optoelectronic detector elements, displacement-dependent output signals are detectable, and wherein said projection graduation has a structure such that in addition to even orders of diffraction and the zero order of diffraction, at least some of the (2n+1)th orders of diffraction are suppressed, where n=1, 2, 3, . . . , as a result of which essentially only the ±1st orders of diffraction contribute to generating said output signals; and wherein said amplitude and phase structures of said projection graduation have the periodicities $TP_{AS}$, $TP_{PS}$, respectively, for which:

$$TP_{AS} = \tfrac{1}{2} \cdot TP_{PS}$$

and $$TP_{AS} = 1/\eta \cdot TP_{DA},$$

wherein
η indicates a divergence-dictated enlargement factor, which results in accordance with the equation, $\eta = 1 + D_2/D_1$, and $TP_{DA}$ represents the period of the resultant fringe pattern immediately upstream of said detection graduation, which results in accordance with the equation:

$$TP_{DA} = (TP_{DET} \cdot \Lambda)/(\Lambda \pm TP_{DET}),$$

wherein $$\eta = ((D_1+D_2)/(D_1+D_2+D_3)) \cdot (TP_{PE}/(n \cdot m \pm 1)),$$

where $TP_{DET}$:=graduation period of said detection graduation;
$D_1$:=spacing between said transmitting graduation and projection graduation, if a divergent system with said transmitting graduation is involved;
$D_2$:=spacing between said projection graduation and said detection graduation;
$D_3$:=spacing between said detection graduation and a detection plane that contains said plurality of optoelectronic elements;
$TP_{PE}$:=periodicity of said plurality of optoelectronic elements in said detection plane;
n=1, 2, . . . : number of phase-shifted signal components that are to be furnished by said plurality of optoelectronic elements; and
m=0, 1, 2, 3, . . .

10. The optical position measuring system of claim 9, wherein
a) said phase structure of said projection graduation comprises periodically disposed phase structure subregions having the graduation period $TP_{PS}$, with the width $\tfrac{1}{2} \cdot TP_{PS}$ and with a phase-shifting effect and a phase depth $\phi = \pi$; and
b) said amplitude structure of said projection graduation comprises periodically disposed amplitude structure subregions having said graduation period $TP_{AS} = TP_{PS}/2$, and said amplitude structure subregions are embodied as opaque to light striking them and have an approximate width in said measurement direction of $TP_{AS}/3$.

11. The optical position measuring system of claim 10, wherein in said opaque amplitude structure subregions of said projection graduation, a graduation substructure is disposed, by way of which a sharply deflecting effect on beams striking it results, so that no light from these subregions reaches said plurality of optoelectronic detector elements.

12. An optical position measuring system, comprising:
a detection graduation that functions as a measuring graduation;
a scanning unit spaced from said detection graduation and movable relative to said detection graduation in at least one measurement direction, said scanning unit comprising:
a light source that emits light;
a projection graduation that receives said light emitted by said light source, said projection graduation comprising periodic amplitude and phase structures disposed in alternation in the measurement direction so as to generate a first set of beams of light that impinge upon said detection graduation;
a plurality of optoelectronic detector elements that receive a second set of beams that are generated by said detection graduation in response to said detection graduation receiving said first set of beams; and
wherein said light emitted from said light source interacts with said projection graduation so as to project a fringe pattern onto said detection graduation, so that via said plurality of optoelectronic detector elements, displacement-dependent output signals are detectable, and wherein said projection graduation has a structure such that in addition to even orders of diffraction and the zero order of diffraction, at least some of the (2n+1)th orders of diffraction are suppressed, where n=1, 2, 3, . . . , and wherein the ±3rd orders of diffraction are suppressed as a result of which essentially only the ±1st orders of diffraction contribute to generating said output signals; and
wherein
a) said phase structure of said projection graduation comprises periodically disposed phase structure subregions having the graduation period $TP_{PS}$, with the width $½*TP_{PS}$ and with a phase-shifting effect and a phase depth $\phi=\pi$; and
b) said amplitude structure of said projection graduation comprises periodically disposed amplitude structure subregions having said graduation period $TP_{AS}=TP_{PS}/2$, and said amplitude structure subregions are embodied as opaque to light striking them and have an approximate width in said measurement direction of $TP_{AS}/3$.

13. The optical position measuring system of claim 12, wherein in said opaque amplitude structure subregions of said projection graduation, a graduation substructure is disposed, by way of which a sharply deflecting effect on beams striking it results, so that no light from these subregions reaches said plurality of optoelectronic detector elements.

14. An optical position measuring system, comprising:
a detection graduation that functions as a measuring graduation;
a scanning unit spaced from said detection graduation and movable relative to said detection graduation in at least one measurement direction, said scanning unit comprising:
a light source that emits light;
a projection graduation that receives said light emitted by said light source, said projection graduation comprising periodic amplitude and phase structures disposed in alternation in the measurement direction so as to generate a first set of beams of light that impinge upon said detection graduation;
a plurality of optoelectronic detector elements that receive a second set of beams that are generated by said detection graduation in response to said detection graduation receiving said first set of beams;
a transmitting graduation; and
wherein said light emitted from said light source interacts with said projection orders of diffraction and the zero order of diffraction, at least some of the (2n+1)th orders of diffraction are suppressed, where n=1, 2, 3, . . . , as a result of which essentially only the ±+1st orders of diffraction contribute to generating said output signals; and wherein beams emitted by said light source reach said transmitting graduation, embodied as a reflection graduation, and from there a reflection in the direction of said projection graduation takes place, and finally, after passing through said projection graduation, said beams reach said plurality of optoelectronic detector elements.

15. An optical position measuring system, comprising:
a scanning unit spaced from a projection graduation and movable relative to said projection graduation in at least one measurement direction, said scanning unit comprising:
a light source that emits light; and
a detection graduation;
a projection graduation that functions as a measuring graduation, said projection graduation receives said light emitted by said light source, said projection graduation comprising periodic amplitude and phase structures disposed in alternation in the measurement direction so as to generate a first set of beams of light that impinge upon said detection graduation;
a plurality of optoelectronic detector elements that receive a second set of beams that are generated by said detection graduation in response to said detection graduation receiving said first set of beams; and
wherein said light emitted from said light source interacts with said projection graduation so as to project a fringe pattern onto said detection graduation, so that via said plurality of optoelectronic detector elements, displacement-dependent output signals are detectable, and wherein said projection graduation has a structure such that in addition to even orders of diffraction and the zero order of diffraction, at least some of the (2n+1)th orders of diffraction are suppressed, where n=1, 2, 3, . . . , as a result of which essentially only the ±1st orders of diffraction contribute to generating said output signals.

16. The optical position measuring system of claim 15, further comprising:
a transmitting graduation that receives said light from said light source and transmits light to said projection graduation.

17. The optical position measuring system of claim 16, wherein beams emitted by said light source pass through said transmitting graduation embodied as a transmission graduation, then reach said projection graduation embodied as a reflection graduation, and after back-reflection from said projection graduation, said beams reach said plurality of optoelectronic detector elements.

18. The optical position measuring system of claim 16, wherein said amplitude and phase structures of said projection graduation have the periodicities $TP_{AS}$, $TP_{PS}$, respectively, for which:

$$TP_{AS} = \frac{1}{2} * TP_{PS}$$

and $$TP_{AS} = 1/\eta * TP_{DA},$$

wherein
- $\eta$ indicates a divergence-dictated enlargement factor, which results in accordance with the equation, $$\eta + 1 = D_2/D_1, \text{ and}$$

$TP_{DA}$ represents the period of the resultant fringe pattern immediately upstream of said detection graduation, which results in accordance with the equation:

$$TP_{DA} = (TP_{DET} * .\Lambda)/.(\eta \pm TP_{DET}),$$

wherein $$.\Lambda = ((D_1 + D_2)/(D_1 + D_2 + D_3)) * (TP_{PE}/(n*m \pm 1)),$$

where
- $TP_{DET}$ := graduation period of said detection graduation;
- $D_1$ := spacing between said transmitting graduation and projection graduation, if a divergent system with said transmitting graduation is involved;
- $D_2$ := spacing between said projection graduation and said detection graduation;
- $D_3$ := spacing between said detection graduation and a detection plane that contains said plurality of optoelectronic elements;
- $TP_{PE}$ := periodicity of said plurality of optoelectronic elements in said detection plane;
- n=1, 2, . . . : number of phase-shifted signal components that are to be furnished by said plurality of optoelectronic elements; and
- m=0, 1, 2, 3, . . .

19. The optical position measuring system claim 18, wherein
a) said phase structure of said projection graduation comprises periodically disposed phase structure subregions having the graduation period $TP_{PS}$, with the width $\frac{1}{2}*TP_{PS}$ and with a phase-shifting effect and a phase depth $\phi = \pi$; and
b) said amplitude structure of said projection graduation comprises periodically disposed amplitude structure subregions having said graduation period $TP_{AS} = TP_{PS}/2$, and said amplitude structure subregions are embodied as opaque to light striking them and have an approximate width in said measurement direction of $TP_{AS}/3$.

20. The optical position measuring system of claim 19, wherein in said opaque amplitude structure subregions of said projection graduation, a graduation substructure is disposed, by way of which a sharply deflecting effect on beams striking it results, so that no light from these subregions reaches said plurality of optoelectronic detector elements.

21. The optical position measuring system of claim 15, further comprising:
a fringe pattern graduation that receives light from said detection graduation and directs said second set of beams to said plurality of optoelectronic detector elements.

22. The optical position measuring system of claim 21, wherein said fringe pattern graduation and said plurality of optoelectronic detector elements are embodied as an integral component in the form of a detector arrangement.

23. The optical position measuring system of claim 15, wherein said projection graduation has a structure such that with it, besides the even orders of diffraction and the zero order of diffraction, the ±3rd orders of diffraction are suppressed.

24. The optical position measuring system of claim 23, wherein
a) said phase structure of said projection graduation comprises periodically disposed phase structure subregions having the graduation period $TP_{PS}$, with the width $\frac{1}{2}*TP_{PS}$ and with a phase-shifting effect and a phase depth $\phi = \pi$; and
b) said amplitude structure of said projection graduation comprises periodically disposed amplitude structure subregions having said graduation period $TP_{AS} = TP_{PS}/2$, and said amplitude structure subregions are embodied as opaque to light striking them and have an approximate width in said measurement direction of $TP_{AS}/3$.

25. The optical position measuring system of claim 24, wherein in said opaque amplitude structure subregions of said projection graduation, a graduation substructure is disposed, by way of which a sharply deflecting effect on beams striking it results, so that no light from these subregions reaches said plurality of optoelectronic detector elements.

26. The optical position measuring system of claim 15, wherein said projection graduation being embodied as a reflection graduation.

27. The optical position measuring system of claim 15, wherein said detection graduation and said plurality of optoelectronic detector elements are embodied as an integral component in the form of a detector arrangement.

\* \* \* \* \*

UNITED STATES PATENT AND TRADEMARK OFFICE
CERTIFICATE OF CORRECTION

PATENT NO. : 6,541,761 B1 Page 1 of 1
DATED : April 1, 2003
INVENTOR(S) : Wolfgang Holzapfel et al.

It is certified that error appears in the above-identified patent and that said Letters Patent is hereby corrected as shown below:

Column 14,
Line 32, delete "$TP_{DA} = (TP_{DET}* . \Lambda) / . (\Lambda \pm TP_{DET}),$" and substitute
-- $TP_{DA} = (TP_{DET}*\Lambda) / (\Lambda \pm TP_{DET}),$ --

Line 36, delete "$\eta = ((D_1+D_2)/(D_1+D_2+D_3))*(TP_{PE}/(n*m\pm1)),$" and substitute
$\Lambda = ((D_1+D_2)/(D_1+D_2+D_3))*(TP_{PE}/(n*m\pm1)),$ --

Column 16,
Line 14, after "said projection" insert
-- graduation so as to project a fringe pattern onto said detection graduation, so that via said plurality of optoelectronic detector elements, displacement-dependent output signals are detectable, and wherein said projection graduation has a structure such that in addition to even --.

Line 17, delete "$\pm+1st$" and substitute -- $\pm 1st$ -- in its place.

Column 17,
Line 14, delete "$\eta+1=D_2/D_1,$" and substitute -- $\eta=1+D_2/D_1,$ --

Line 19, delete "$TP_{DA}=(TP_{DET}* . \Lambda) / . (\eta \pm TP_{DET}),$" and substitute
-- $TP_{DA}=(TP_{DET}*\Lambda)/(\Lambda \pm TP_{DET}),$ --

Line 24, delete "$. \Lambda =$" and substitute -- $\Lambda =$ --

Signed and Sealed this

Sixth Day of April, 2004

JON W. DUDAS
*Acting Director of the United States Patent and Trademark Office*